July 16, 1963    R. A. NOLAND ET AL    3,098,025
FOIL ELEMENT FOR NUCLEAR REACTOR
Filed Sept. 18, 1961
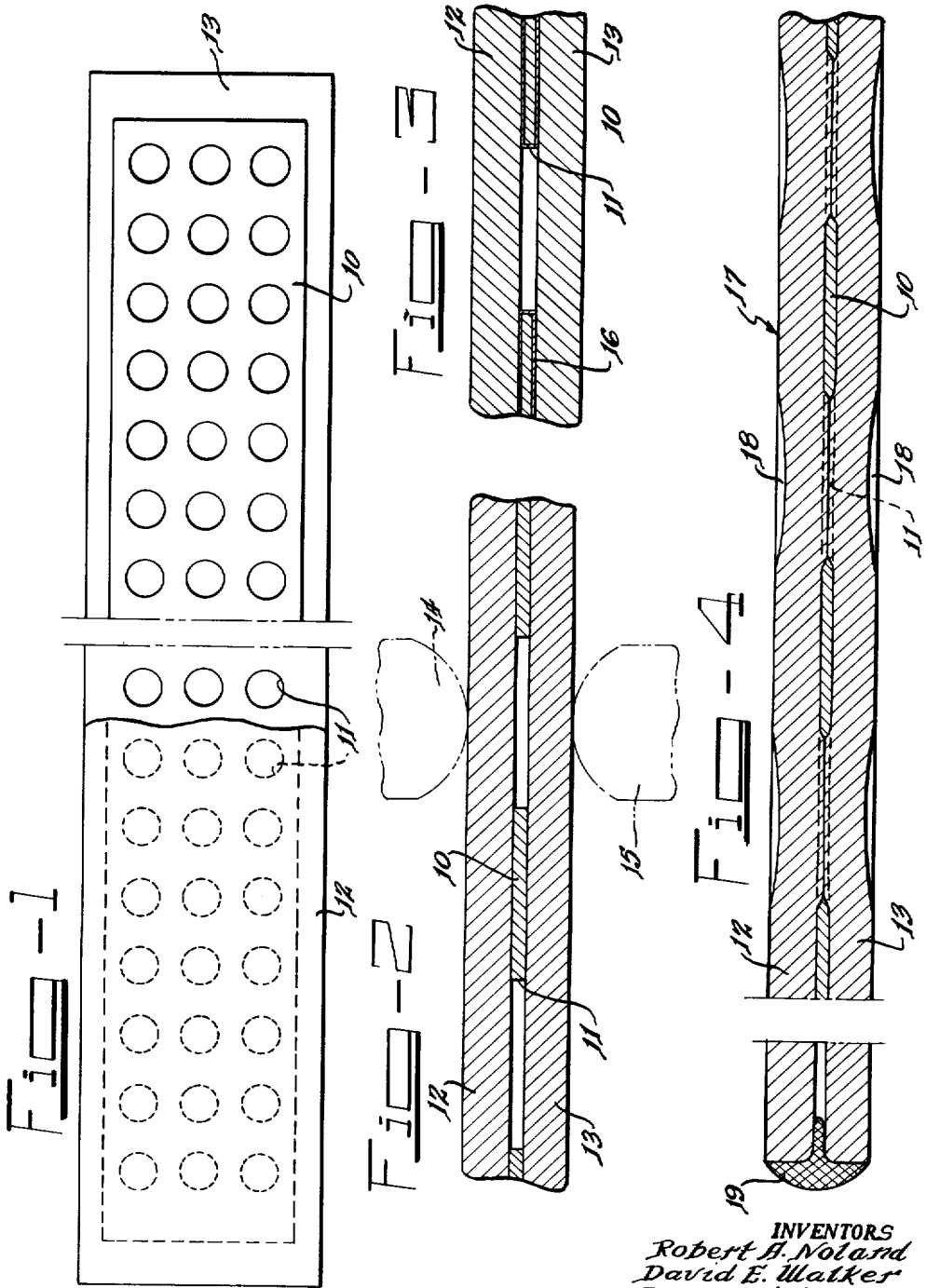
INVENTORS
Robert A. Noland
David E. Walker
Bernard I. Spinrad
Attorney United States Patent Office 3,098,025
Patented July 16, 1963

3,098,025
FOIL ELEMENT FOR NUCLEAR REACTOR
Robert A. Noland, Chicago, David E. Walker, Park Forest, and Bernard I. Spinrad, Naperville, Ill., assignors to the United States of America as represented by the United States Atomic Energy Commission
Filed Sept. 18, 1961, Ser. No. 139,017
10 Claims. (Cl. 204—193.2)

The invention relates to a novel nuclear reactor fuel element with mechanical and heat transfer reinforcements arranged in a tessellated pattern in a foil between protective cladding sheets, and to a method for making the same.

Several nuclear reactor fuel elements of the flat type have been devised, but all of them are expensive to fabricate. In order to promote heat transfer, prevent corrosion and confine the gaseous and volatile fission products generated within the reactor, strong bracing around the edges known as a "picture frame" is used; to further the same ends a lattice of cross-bracing is often added between opposite edges of the picture frame.

The expense of producing fuel elements of the type described is particularly burdensome in the case of low power reactors which are designed for experimental and teaching purposes; not only are the funds of research and educational institutions limited, but the comparatively low temperatures at which the reactors operate and the small amount of fission products generated make the expensive type of construction described unnecessary. On the other hand, fuel elements for the purposes mentioned should be reasonably strong and have acceptable heat-transfer properties to avoid melt-downs and ensure safety to personnel.

It is, accordingly, an object of the invention to provide a nuclear reactor fuel element of the flat foil type which will have reasonable mechanical strength and heat-transfer properties, and which can be fabricated at lower cost than presently available elements.

It is another object to provide a method of making nuclear reactor fuel elements of the kind just described.

Other objects of the invention will appear as the description proceeds.

The foregoing objects are attained by our discovery that a nuclear reactor fuel element may be cheaply fabricated and given reasonable mechanical strength and heat-transfer properties by perforating a foil of nuclear fuel material such as uranium in a tessellated pattern of certain dimensions, then covering the perforated foil on both sides with sheets of cladding metal of somewhat greater length and width, and joining the latter sheets together through the perforations, as by spot-welding. When the two cladding sheets are then joined around their edges beyond the edges of the fuel metal sheet as by seam-welding, an element is produced with the requisite properties at little expense.

Reference is now made to the drawings, FIG. 1 of which shows the foil of fuel metal perforated in a tessellated pattern. A blanket element could be fabricated in the same general way.

FIG. 2 shows a cross-sectional view of one embodiment of the invention in the process of being fabricated.

FIG. 3 shows a similar cross-sectional view of another embodiment of the invention.

FIG. 4 shows a cross-sectional view of the completed element of the invention.

In FIG. 1 the fuel foil 10 of uranium, enriched uranium or other such fuel material, has a number of circular perforations 11 arranged in the tessellated pattern of equal squares. It is covered by cladding metal sheets 12 and 13, sheet 12 being partly broken away.

In FIG. 2 the foil 10 has been covered with sheets of cladding metal 12 and 13 and welding electrodes 14 and 15 are in place on opposite sides in alignment with a perforation 11.

In FIG. 3 foil 10 has a plating 16 of nickel, and is otherwise like the embodiment of FIG. 2.

FIG. 4 shows the completed element 17 in section having shallow dimples 18 over the locations of the perforations 11. 19 is a seam-weld around the edges of the element 17, making it water-tight.

In carrying out our invention we use fuel foils from about .002 to about .005 inch in thickness, foils of .005 being preferred. The diameter of the perforations should be at least one-half but no more than two-thirds the distances center-to-center between adjacent perforations. If the perforations are made smaller than this the element will lack strength; if they are larger it will be unnecessarily strong and space within the reactor will be wasted. We prefer, for a fuel metal sheet of 20% enriched uranium .005 inch thick, circular holes $27/64$ inch in diameter, $11/16$ inch center-to-center. Three rows of 30 holes, or a total of 90, may thus be arranged on a sheet having dimensions in inches of $2\frac{1}{8}$ by $23\frac{5}{8}$.

The cladding metal sheets should be from three to five times as thick as the fuel or blanket metal sheets. We prefer to have them four times as thick, or, for a fuel metal foil .005 inch thick, the cladding metal sheets are preferably .020 inch thick. For a fuel or blanket sheet of uranium the substantially pure aluminum of commerce known as 1200 or 2S aluminum is preferred as cladding metal.

With our method of construction no metallurgical bond is necessary to promote heat transfer between the inner sheet and the cladding. The joining of the two cladding sheets together at numerous points through the perforations in the inner sheet exerts a compressive effect to bring about an intimate contact which is ordinarily sufficient for this purpose. However, if improved heat transfer is desired, the fuel foil may be plated with nickel, as shown in FIG. 3. The nickel plating prevents the formation of an oxide film that would resist heat transfer.

The numerous points of juncture, in addition to improving heat transfer, make the element strong, and no external physical reinforcement such as picture frame or lattice is needed.

In FIG. 2 only one pair of opposing electrodes is shown, but it is to be understood that in actual production a plurality of electrode pairs may be used, so that all, or a substantial fraction, of the welds through the perforations may be made in one operation.

It will be understood that the invention is not to be limited to the details given herein but that it may be modified within the scope of the appended claims.

What is claimed is:

1. A nuclear reactor fuel element comprising an inner foil of nuclear fuel material having tessellated perforations therein and sheets of cladding metal covering the foil of fuel material and in intimate contact with it on both sides, the said sheets of cladding metal being joined to one another around the outer edges and through the perforations of the inner foil.

2. The fuel element of claim 1 where the sheets of cladding metal are joined to each other by welds.

3. A nuclear reactor fuel element comprising an inner foil of nuclear fuel material plated with nickel having tessellated perforations therein and sheets of cladding metal covering the plated foil of fuel material and in intimate contact with it on both sides, the said sheets of cladding metal being joined to one another around the outer edges and through the perforations of the inner foil.

4. The fuel element of claim 3 where the sheets of cladding metal are joined to each other by welds.

5. The fuel element of claim 1 where the perforations are circles having a diameter which is at least one-half and not more than two-thirds the distances center-to-center between adjacent perforations.

6. The fuel element of claim 1 where the sheets of cladding metal are from three to five times as thick as the foil of fuel material.

7. The fuel element of claim 1 where the foil is from about 0.002 to about 0.005 inch thick.

8. The fuel element of claim 3 where the plated foil is from about 0.002 to about 0.005 inch thick.

9. A method of making a nuclear reactor fuel element comprising making a plurality of perforations in a tessellated pattern in a foil of nuclear fuel material, placing sheets of cladding material of greater length and width than the foil in intimate contact with the foil on both sides, and joining the sheets of cladding material around the edges and through the perforations.

10. A method of making a nuclear reactor fuel element comprising making a plurality of circular perforations in a regular square pattern in a foil comprising nuclear fuel material, placing sheets of cladding metal of greater length and width than the foil in intimate contact with the foil on both sides, bringing a pair of opposed welding electrodes into contact with the cladding sheets in alignment with one of the perforations and welding the cladding sheets together therethrough, welding the cladding sheets together through the remainder of the perforations in like manner, and welding the cladding sheets together around their outer edges.

References Cited in the file of this patent

UNITED STATES PATENTS

| | | |
|---|---|---|
| 3,004,906 | Binstock | Oct. 17, 1961 |
| 3,008,884 | Schippereit et al. | Nov. 14, 1961 |